Nov. 23, 1954

X. B. K. GREEN ET AL 2,694,887

DEBURRING DEVICE FOR BLADES OF
SLICING AND CUTTING MACHINES

Filed June 18, 1953

XAN B. K. GREEN,
HARRY PREBLE, JR.,
INVENTORS,

By
ATTORNEY.

United States Patent Office 2,694,887
Patented Nov. 23, 1954

2,694,887

DEBURRING DEVICE FOR BLADES OF SLICING AND CUTTING MACHINES

Xan B. K. Green, New Paltz, and Harry Preble, Jr., Cross River, N. Y., assignors to General Slicing Machine Co., Inc., Walden, N. Y., a corporation of New York Application June 18, 1953, Serial No. 362,553

4 Claims. (Cl. 51—248)

The present invention relates to a device for removing burrs formed on the cutting edge of a rotary disc blade by a sharpening means, and particularly to a deburrer which is permanently mounted on the machine of which such blade is a part. The deburring device which is the subject of this invention, is especially adaptable for use in food slicing machines and such embodiment is illustrated herein to show one application of this invention.

An object of this invention is to provide a novel and improved manually-manipulated deburring device of the character mentioned, in which the pressure of the deburring element against the blade is automatically controlled and is independent of the force the operator applies to bring said element into deburring position.

Another object hereof is to provide a deburring device of the nature set forth, of novel and improved construction in which the force applied by the operator to shift the deburring element into cutting position, is not imparted to such element to bear pressure against the blade, thus avoiding "burning" or other hurt to the cutting edge of the disc blade.

Another object hereof is to provide a novel and improved deburring device for disc cutting blades, applicable for use in food slicing machines. Since many of these machines have sharpening devices, the inclusion of the present deburring means would be a desired addition.

A further object of this invention is to provide a deburring device of the character mentioned, of novel and improved construction, which is reasonably cheap to manufacture, easy to use, mount and remove and efficient in carrying out the purposes for which it is designed.

Other objects and advantages will become apparent as this disclosure proceeds.

In the accompanying drawings forming part of this specification, similar characters of reference indicate corresponding parts in all the views.

Figure 1:
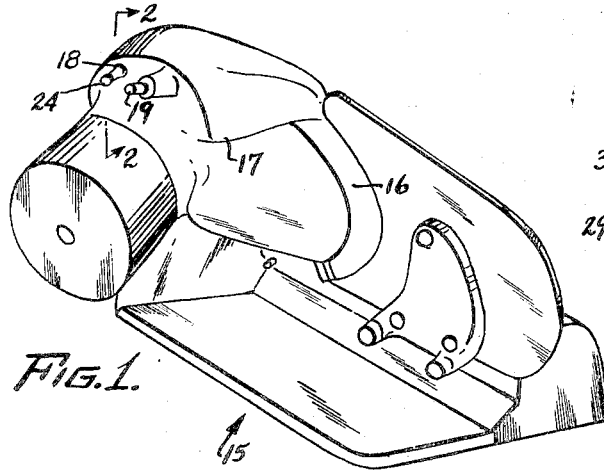
Fig. 1 is a perspective view of a food slicing machine which includes a deburring device embodying the teachings of this invention.

In the drawings, the numeral 15 designates generally a food slicing machine having a rotatably mounted disc cutting blade 16 on the housing 17 which is provided with a bore through its wall at 18. A sharpening device for the cutting blade may be deemed included though not shown, except that the manually operated push-button 19 is indicated, which when pressed will bring an abrasive member to bear against the cutting rim surface 16' of the blade thereby making such blade sharp, but also causing burrs as indicated at 20 to occur. It is such burrs that the deburring wheel 21 is intended to remove when in contact with the back surface of the disc blade 16 while the latter rotates.

The bore 18 is practical to be of uniform diameter provided with a ring 22 fixed therein at its outer end whereby a stop is provided to act as a rest for the compression coil spring 23 within said bore. The reduced shank of a pull-button 24 is positioned through said coil spring 23 and ring 22, and extends outwardly of housing 17 to be accessible for manual manipulation to permit the deburring wheel 21 to come in contact with the cutting blade 16 for accomplishing the deburring operation. The end of the pull-button 24 which is interior the bore 18 is provided with an enlargement 24' against which the mentioned coil spring 23 also rests. It is evident that the action of this coil spring 23 is to urge the pull-button 24 inwardly of the bore 18.

Figure 4:
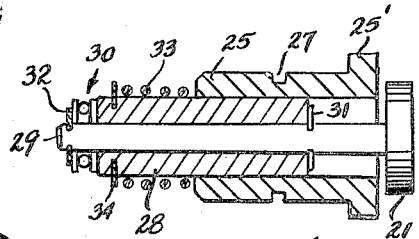
Fig. 4 is a somewhat enlarged view of a portion of the said device removed from its housing, various features of which will be explained.

A bushing 25 has a slide-fit within the bore 18 at the inner end of the latter and is detachably engaged by a spring-loaded plunger 26 within an exterior annular groove 27. To aid locating and handling of said bushing, it is provided with the flange 25'. A tubular member 28, slidingly fitted in this bushing, extends therefrom towards the pull-button 24 and serves as a bearing for the shank 29 which is rotatably journalled thereto. The numeral 30 denotes a thrust bearing unit which may be included on the shank 29, which shank carries the retainer rings 31, 32 to maintain the assembly of the unitary structure effected as is shown in Fig. 4. This unit can of course be removed by merely pulling on the handle-end 26' of the spring plunger. Said shank 29 extends outward of the member 28 and across the plane of the blade 16, where it terminates in a deburrer element which is the disc 21. A compression coil spring 33 lies on and about the tubular member 28, and rests between the retainer ring 34 mounted on said member, and the inner end of the bushing 25. The action of this coil spring 33 is to urge the tubular member 28, and hence the shank 29, towards the pull-button 24 so that the deburrer element 21 shall contact the disc blade 16.

Figure 2:
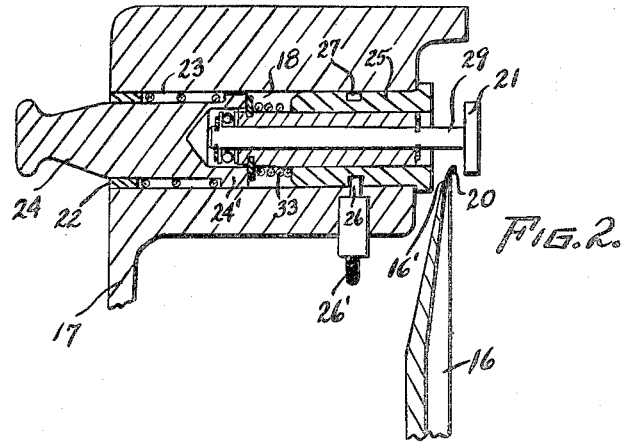
Fig. 2 is a section taken at lines 2—2 in Fig. 1, showing the deburring device in its normal rest inactive position.
Figure 3:
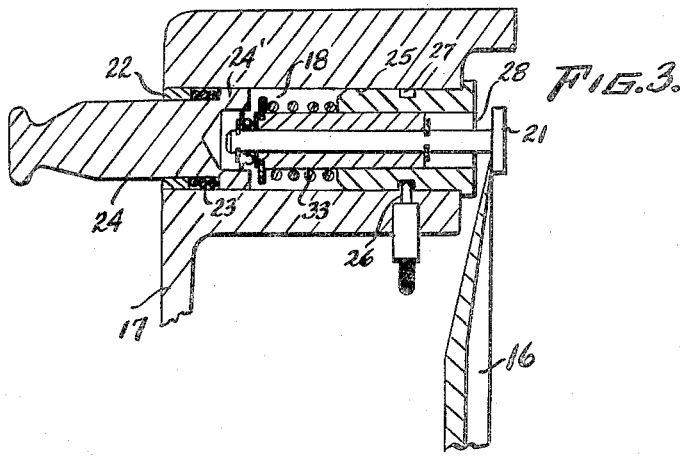
Fig. 3 is like Fig. 2, but shows the deburring device in operative position.

In normal rest position shown in Fig. 2, the flange 24' of the pull-button 24, acts as a stop for the retainer ring 34. Said pull-button being in its furthest position inward in the bore 18, because coil spring 23 is now greatest in length, deburring disc 21 is out of contact with the disc blade 16. It is to be noted that spring 23 is much stronger than spring 33, and to such extent that in the condition shown in Fig. 2, spring 33 is in compressed stressed condition.

To operate the deburrer, which is done while the blade 16 is rotating, the button 24 is pulled outwardly and such movement of said button is permitted until it is away from the retainer ring 34, whereupon the stressed spring 33 causes movement of the deburrer disc 21 until the latter contacts the blade 16 to work thereon. Dimensions and strength of spring 33 is so designed that the pressure afforded by said spring's action of the disc 21 against the blade 16, is proper to accomplish deburring without hurting the blade. This pressure is of course independent of any force applied by the operator.

This invention is capable of numerous forms and various applications without departing from the essential features herein disclosed. It is therefore intended and desired that the embodiment herein be deemed illustrative and not restrictive and that the patent shall cover all patentable novelty herein set forth; reference being had to the following claims rather than to the specific description herein to indicate the scope of this invention.

We claim:

1. In combination with a frame, a blade having a beveled edge on one surface thereof, movably mounted on the frame, of a device to remove burrs extending from the second surface of said blade, comprising a shank longitudinally slidably mounted on the frame and spaced from said blade; said shank being positioned across the plane of said blade; one end of said shank being aside and beyond the surface of the blade having the beveled edge and the second end of said shank being aside and beyond the second surface of the blade, a deburring element carried on said second end of the shank; said deburring element extending laterally from the shank so that upon movement of said shank whereby the deburring element is carried to the blade, said deburring element will contact the second surface of said blade behind the beveled edge, a first spring means acting on the shank to maintain it in position whereby the deburring element is in contact with the blade, a member movably mounted on the frame, positioned to hold the shank whereby the deburring element is away from the blade and said first spring is stressed; such being the normal rest position of said member and second spring means on the frame to hold said member in such normal rest position; said second spring means being of greater strength than the first spring means; said member when moved away from the shank, permitting the first stressed spring means to shift the shank whereby said deburring element contacts the blade.

2. In combination with a frame, a blade having a beveled edge on one surface thereof, movably mounted on the frame, of a device to remove burrs extending from the second surface of said blade, comprising a shank longitudinally slidably mounted on the frame within a bore through said frame; said bore being along a line intersecting the plane of the blade; one end of said shank being within said bore and the other end of said shank extending out of said bore through the plane of the blade and beyond the second surface of said blade, a deburring element carried on the second end of the shank; said deburring element extending laterally from the shank so that upon longitudinal movement of said shank whereby the deburring element is carried to the blade, said element will contact the second surface of the blade behind the beveled edge, a first compression coil spring positioned about the shank within the bore, mounted to act on the shank to maintain it in position whereby the deburring element is in contact with the blade, a rod-piece slidably positioned within said bore and extending outwardly therefrom in a direction away from the deburring element; said rod piece in normal rest position, holding the shank against inward movement into the bore whereby said deburring element is away from the blade, a second compression coil spring positioned about the rod piece within said bore and mounted to hold the said rod-piece in its said normal rest position; the strength of the second coil spring being greater than that of the first coil spring, whereupon when said rod-piece is manually moved partly out of the bore thereby compressing the second coil spring, the first coil spring will shift the shank into the bore towards the rod-piece whereupon the deburring element will contact the blade and upon release of said rod-piece, the second spring will restore said rod piece to its normal rest position whereupon the first coil spring will be stressed and the shank will be moved by the retracting rod piece whereby the deburring element will be away from the blade.

3. The combination as defined in claim 2, including a bushing releasably mounted within said bore; the mentioned shank being slidably mounted through said bushing; one end of the first coil spring resting against the end of said bushing which is furthest from the deburring element and means associated with the other end of said first coil spring holding it on said shank and wherein the deburring element extends laterally beyond the hole in said bushing, whereby said bushing and shank are permanently associated and are removable from said bore as a unitary structure.

4. The combination as defined in claim 3, including a sleeve mounted slidably within said bushing; said shank being positioned through said sleeve and journalled thereon for rotation therein.

References Cited in the file of this patent

UNITED STATES PATENTS

| Number | Name | Date |
|---|---|---|
| 1,310,700 | Hood et al. | July 22, 1919 |
| 1,772,705 | Campbell | Aug. 12, 1930 |
| 1,977,418 | Winkler | Oct. 16, 1934 |